(12) United States Patent
Katagiri et al.

(10) Patent No.: US 7,178,818 B2
(45) Date of Patent: Feb. 20, 2007

(54) VIBRATION DAMPING DEVICE FOR USE IN AUTOMOTIVE SUSPENSION SYSTEM AND SUSPENSION SYSTEM USING THE SAME

(75) Inventors: Akira Katagiri, Kasugai (JP); Shiro Nakajima, Itami (JP); Yasuhiro Kubota, Kobe (JP)

(73) Assignees: Tokai Rubber Industries, Ltd., Komaki (JP); Sumitomo Electric Industries, Ltd., Osaka (JP); Sumitomo Rubber Industries, Ltd., Kobe (JP); Advics Co., Ltd., Kariya (JP)

( * ) Notice: Subject to any disclaimer, the term of this patent is extended or adjusted under 35 U.S.C. 154(b) by 305 days.

(21) Appl. No.: 10/795,152

(22) Filed: Mar. 5, 2004

(65) Prior Publication Data

US 2004/0201196 A1 Oct. 14, 2004

(30) Foreign Application Priority Data

Mar. 10, 2003 (JP) ............................. 2003-063584

(51) Int. Cl.
*B60G 7/00* (2006.01)

(52) U.S. Cl. ........................... 280/124.144; 280/5.516; 267/140.12

(58) Field of Classification Search ................. 280/5.5, 280/5.516, 5.523, 5.524, 124.134, 124.135, 280/124.136, 124.144; 267/292, 293, 140.12
See application file for complete search history.

(56) References Cited

U.S. PATENT DOCUMENTS

| | | | |
|---|---|---|---|
| 4,687,223 A * | 8/1987 | Miyoshi et al. .......... 280/5.516 |
| 5,086,649 A | 2/1992 | Yamaoka | |
| 5,226,635 A | 7/1993 | Nakamura | |
| 5,472,225 A * | 12/1995 | Harara et al. ............ 280/86.75 |
| 5,769,380 A * | 6/1998 | Hibi et al. ................ 267/141.2 |
| 5,975,541 A * | 11/1999 | Harara et al. ............ 280/5.524 |
| 5,979,218 A * | 11/1999 | Biddle et al. .............. 73/11.04 |
| 6,006,597 A | 12/1999 | Miyazaki | |
| 6,070,862 A * | 6/2000 | Miyamoto ............. 267/140.12 |
| 6,126,177 A * | 10/2000 | Steinert ...................... 280/5.5 |
| 6,439,359 B1 * | 8/2002 | Kato et al. .................. 188/379 |
| 6,622,996 B2 * | 9/2003 | Mayerbock et al. ..... 267/141.3 |

FOREIGN PATENT DOCUMENTS

| | | |
|---|---|---|
| DE | 4102085 A1 | 8/1991 |
| DE | 4205224 C2 | 8/1992 |
| JP | 2628444 | 4/1997 |
| JP | 2001-191767 | 7/2001 |
| JP | 2002-316502 | 10/2002 |

OTHER PUBLICATIONS

German Office Action dated May 24, 2005 from corresponding German Application.

\* cited by examiner

*Primary Examiner*—Paul N. Dickson
*Assistant Examiner*—Drew J. Brown
(74) *Attorney, Agent, or Firm*—Beyer Weaver LLP (57) ABSTRACT

A vibration damping device for use in a automotive suspension system, adapted to be disposed at a linking portion between a body of the vehicle and a suspension member that connects and supports a wheel on the body is disclosed. The vibration damping device comprises a load sensing unit adapted to sense a signal corresponding to a load exerted between the body and the suspension member. A suspension system equipped with the same is also disclosed.

8 Claims, 6 Drawing Sheets

VIBRATION DAMPING DEVICE FOR USE IN AUTOMOTIVE SUSPENSION SYSTEM AND SUSPENSION SYSTEM USING THE SAME

INCORPORATED BY REFERENCE

The disclosure of Japanese Patent Application No. 2003-063584 filed on Mar. 10, 2003 including the specification, drawings and abstract is incorporated herein by reference in its entirety.

BACKGROUND OF THE INVENTION

1. Field of the Invention

The present invention relates generally to a vibration damping device for use in an automotive suspension system, and a suspension system using the device. More particularly, the present invention is concerned with such a vibration damping device equipped with a sensing member providing signals usable as sensor signals for control in a control system for vehicle driving conditions.

2. Description of the Related Art

With the goal of improving drive stability of automotive vehicles, mechanically assisted driver control has been studied as a way to reduce uncontrolled vehicle behavior, such as skidding. Specifically, antilock braking systems (ABS) has already come into use as means for preventing locking of the wheels during braking. Additionally, there are proposed vehicle control systems such as traction control, which reduces wheel spin during acceleration, or vehicle stability control, which affords overall control of stabilization of vehicle behavior.

These vehicle control systems as discussed above are typically carried out utilizing sensor signals of various kinds which reflect driving conditions of the vehicle. As one design for sensing such signals, there have proposed to date several mechanisms for sensing external forces acting on the wheels (road surface friction, vertical force, etc) or road surface frictional coefficient. These include, for example, the mechanisms taught in Citations 1, 2, and 3.

[Citation 1] JP-B-2628444
[Citation 2] JP-A-2001-191767
[Citation 3] JP-A-2002-316502

Citation 1 teaches a mechanism constructed with a strain gauge embedded in a hole made in the axle. This mechanism, however, makes a practical implementation difficult owing to axle strength and construction as well as a low manufacturability. In actual practice, it would be necessary to make a number of holes the axle in order to be able to sense in a number of different directions, making practical implementation even more difficult.

Citation 2 teaches another mechanism constructed with sensed elements disposed in the tires, whereby tire deformation, rotation, or the like can be sensed from the outside. This mechanism, however, may possibly suffer from deterioration in tire performance owing to the added sensed elements that are disposed in the tire, as well as damage of the sensed elements by flying pebbles or mud thrown up from the road surface. While it is easy for this mechanism to sense wheel rotation speed, it is exceptionally difficult to calculate external force acting on a wheel using such sensor values.

Citation 3 teaches yet another mechanism constructed with a rim wheel elastically coupled to a disk part, whereby displacement of the rim wheel relative to the disk part is sensed by means of a position sensor or the like. In this mechanism, however, the need to elastically couple the rim wheel to the disk part would deteriorate a rigidity of the wheel per se, with adverse effects on driving stability. Additionally, since the sensor is disposed at a location very close to the tire, it is susceptible to be struck by a flying pebble or the like.

SUMMARY OF THE INVENTION

It is therefore one object of this invention to provide a vibration damping device of novel construction for use in a suspension system of an automotive vehicle, which is able to readily provide a sensing mechanism capable of detecting external forces acting on wheels of the vehicle.

It is also another object of the invention to provide a suspension system for an automotive vehicle, which is equipped with the vibration damping device of the invention.

Specifically, it is yet another object of the invention to provide a suspension vibration damping device that is usable as a device for sensing a sensor signal in an antilock braking system, a traction control, vehicle stability control, or other vehicle control system used for the purpose of improving driving stability of an automotive vehicle, and that is suitable as a constituent element of such a vehicle control system as well as a suspension system employing the same.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

The invention in a first aspect thereof relates to a vibration damping device for use in an automotive suspension system. A first mode of the first aspect of the invention is a vibration damping device for use in a suspension system of an automotive vehicle, adapted to be disposed at a linking portion between a body of the vehicle and a suspension member that connects and supports a wheel on the body, the vibration damping device comprising a load sensing unit adapted to sense a signal corresponding to a load exerted between the body and the suspension member.

In the vibration damping device constructed according to this mode of the first aspect of the invention, when sensing external force exerted on the wheel, i.e., external force acting between the wheel and the road surface, a focus is placed upon the suspension member that connects and supports the wheel on the body. Generally, a suspension member exhibits a low spring stiffness at a linking portion thereof to the body than at a linking portion thereof to the wheel. With this arrangement, a vibration from the road surface to the wheel is damped between the suspension member and the body, external force exerted on the wheel is exerted rapidly and highly accurately to the vibration damping device via the suspension member. Thus, a load exerted on the vibration damping device which is disposed between the suspension member and the body corresponds highly accurately and with substantially no lag to external force exerted on the wheel. By sensing this load in the vibration-damping device, an external force exerted on the wheel can be sensed with a sufficient degree of accuracy.

When sensing a load by means of the present vibration damping device, since the sensing portion can be situated in a location a suitable distance away from the wheel, it is possible to effectively avoid damage to the sensor portion by flying pebbles or mud thrown up from the road surface, thus achieving good durability. Additionally, as the suspension vibration damping device is installed at the mounting portion of the suspension member to the body, the mounting portion can be installed fixedly on the body. This facilitates installation of the load sensing unit, as well as avoiding the problem of unstable operation due to displacement of the mounting location, ensuring a consistent performance of the load-sensing unit. Particularly as compared to the case where a sensing unit is disposed on the wheel, an advantage is that it is possible to continue sensing external force exerted on the wheel, even with the wheel in a locked state.

In the present mode, known suspension bushings, upper supports and other members can be utilized as the basic components of the present vibration damping device. The load sensing unit is advantageously arranged by integrally incorporating into the suspension bushing or installing at the suspension bushing installation location, for example, a distance sensor or position sensor for sensing, as a signal corresponding to a load exerted on the wheel, the direction and magnitude of relative displacement of the suspension member relative to the body, or alternatively a load sensor, strain sensor, or the like. This arrangement permits an easy practical application of the present invention, as well as an installation of the load sensing unit onto the vehicle with procedures and space requirements substantially similar to those for installation of vibration damping devices conventionally employed.

A second mode of the first aspect of the invention is a vibration damping device according to the first mode, wherein the load sensing unit is capable of sensing external force exerted on the wheel in each of three directions, i.e., a lengthwise direction, a lateral direction, and a vertical direction of the vehicle, on a basis of a signal corresponding to a load exerted across the body and the wheel. This mode makes it possible to obtain a control signal that is more advantageous for use in a vehicle control system of an automobile. Calculation of external force in the three directions may be realized, for example, by installing sensors able to independently measure a load or displacement in the three directions. Alternatively, where sensors are capable of three-dimensional measurement of a load or displacement, external force in three directions may be derived through calculations from signals obtained from one or two sensors.

A third mode of the first aspect of the invention is a vibration damping device according to the first or second mode, wherein the vibration damping device comprises a rubber busing including a first mounting member fixable to the body of the vehicle, a second mounting member fixable to the suspension member, and an rubber elastic body elastically connecting the first and second mounting members, and wherein the load sensing unit comprises a distance sensor adapted to sense an amount of relative displacement between the first mounting member and the second mounting member. In this mode, the invention is realized to good advantage utilizing conventionally used rubber bushings such as a suspension bushing, by sensing relative displacement of the first mounting member and second mounting member based on elastic deformation of the rubber elastic body. The sensor for sensing relative displacement of the first mounting fixture and second mounting fixture need not be installed directly on the first mounting member and second mounting member, but may instead be installed on the bracket securing the first mounting member or the second mounting member to the suspension member or to the body, or alternatively the sensor installed on the suspension member or the body.

It should be appreciated that the suspension vibration damping device of structure according to this mode can be used as a suspension bushing installed at the linking portion of the suspension member such as an L-arm, A-arm, torsion beam, training arm, or the like. This makes it possible to calculate external force exerted on the wheel with a higher degree of accuracy, and with shorter lag time, as compared to the case where the suspension vibration damping device according to the invention is employed, for example, as an upper support for a suspension.

A fourth mode of the first aspect of the invention is a vibration damping device according to the third mode, wherein the distance sensor is capable of sensing the amount of relative displacement of the first mounting member and -the second mounting member in a lengthwise direction, lateral direction and vertical direction of the vehicle. In this mode, a signal corresponding to a load exerted across the suspension member and the body is sensed independently in three axial directions of the vehicle, making external force exerted on the wheel easier to calculate, as well as more favorable for adoption in a vehicle control system of an automotive vehicle.

A fifth mode of the first aspect of the invention is a vibration damping device according to any one of the first through fourth modes, further comprising a processing unit for deriving external force exerted on the wheel in three directions, i.e., the lengthwise direction, lateral direction, and vertical direction of the vehicle, by processing the signal obtained by means of the load sensing unit in mathematical operations on the basis of output characteristics of the load sensing unit obtained in advance.

The invention in a second aspect thereof relates to a suspension system for an automotive vehicle equipped with the vibration damping device according to the first aspect of the invention. A first mode of the second aspect of the invention is a suspension system for an automotive vehicle comprising: a suspension member for connecting and supporting a wheel on a body of the vehicle; and a vibration damping device adapted to be disposed at a linking portion between the body and the suspension member, wherein the vibration damping device comprises a load sensing unit adapted to sense a signal corresponding to a load exerted between the body and the suspension member.

A second mode of the second aspect of the invention is a suspension system according to the first mode, further comprising another vibration damping device adapted to be disposed at another linking portion between the body of the vehicle and the suspension member. In this mode, signals obtained by means of a plurality of suspension vibration damping devices interposed at a plurality of linking portions of the suspension member to the body are combined and subjected to a calculation process to determine, with a higher degree of accuracy, external force transmitted from the wheel to the body via the suspension member.

A third mode of the second aspect of the invention is a suspension system according to the first mode, wherein the suspension member comprises an independent suspension type suspension arm. In this mode, each wheel is connected and supported on the body via a substantially independent suspension member, and by obtaining signals corresponding to a load exerted on the body through each suspension member. With this arrangement, a load exerted on each wheel can be sensed with higher accuracy on a wheel-bywheel basis, as a result, making it better for use in a vehicle control system for an automotive vehicle.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
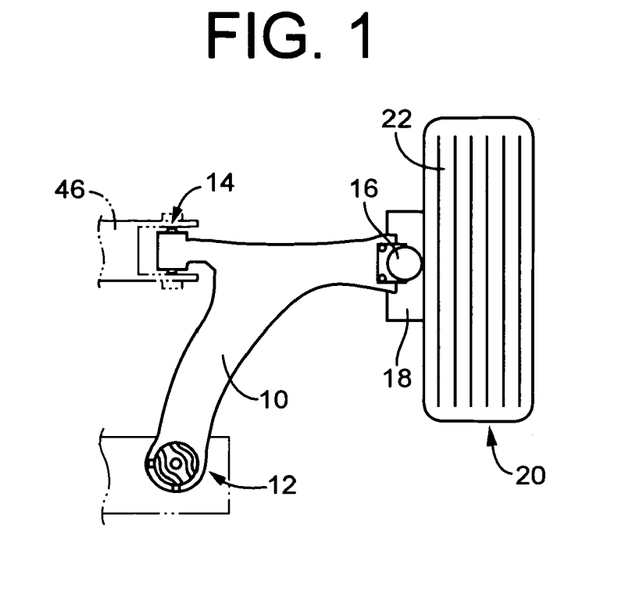
FIG. 1 is a schematic plane view of a suspension system constructed according to one preferred embodiment of the invention.

FIG. 1 is a schematic overall plane view of a suspension system as one embodiment of the invention. In the drawing, 10 denotes an L-arm which is the front suspension member of an automotive vehicle, and a known L-arm may be employed.

The L-arm 10 is elastically connected to a body (not shown) of the vehicle at a total of two points, namely, its center portion which is bend into L shape, and a first end, by means of suspension vibration damping devices, namely, suspension bushings 12, 14. With this arrangement, L-arm 10 is connected and supported so as to swivel in the vertical direction of the body, with a straight line connecting the two suspension bushings 12, 14 as the general support axis. Generally, L-arm 10 is arranged with suspension busing 12, disposed on the L-shaped end, situated towards the front of the vehicle. In FIG. 1, the downward direction is the vehicle frontward direction.

The other end of the L-arm 10 extends towards the side of the vehicle, and at the distal end thereof, a knuckle 18 is attached via a ball joint 16. While not shown in the drawing, the wheel 20 is mounted onto a knuckle spindle projected from the knuckle 18, as in common known practice. Also, as in common known practice, the wheel 20 is composed of a tire 22 mounted fitting about a wheel, not shown. The wheel 20 is steered by swiveling the knuckle 18 about a king pin by a steering rod driven by the steering system.

In this suspension system, oscillating or shaking force exerted by the road surface on the wheel 20 is exerted substantially directly up to the L-arm 10, whereupon transmission of vibration to the body is reduced or attenuated by means of the two suspension bushings 12, 14 interposed between the L-arm 10 and the body. That is, the L-arm 10 has sufficient rigidity characteristics at the connecting portion thereof to the wheel 20, as compared to the connecting portion thereof to the body.

In the present embodiment, a specific structure comprising a distance sensor 24 as a load sensing unit is employed as one of the suspension bushings 12 attached to the L-arm 10 at the vehicle front end thereof, by way of example.

Figure 2:
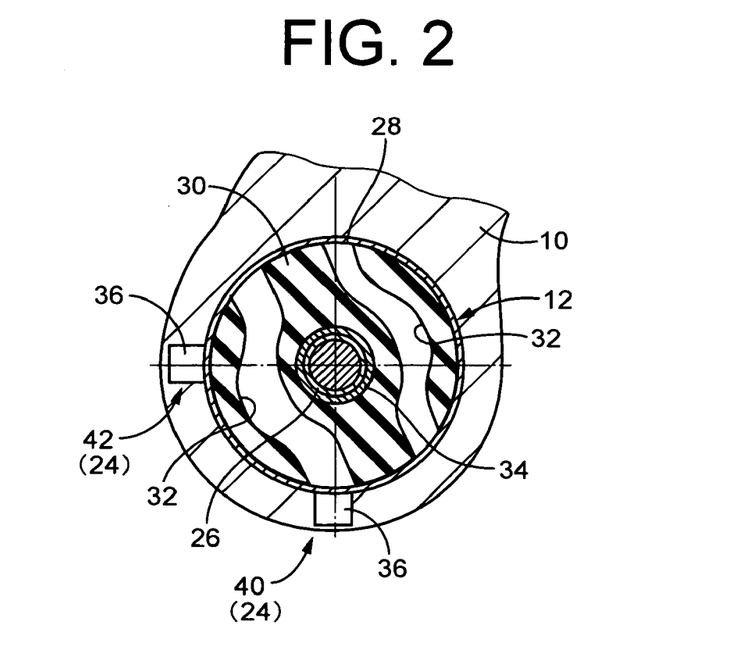
FIG. 2 is an enlarged transverse cross sectional view of a suspension bushing mounted portion of the suspension system of FIG. 1.
Figure 3:
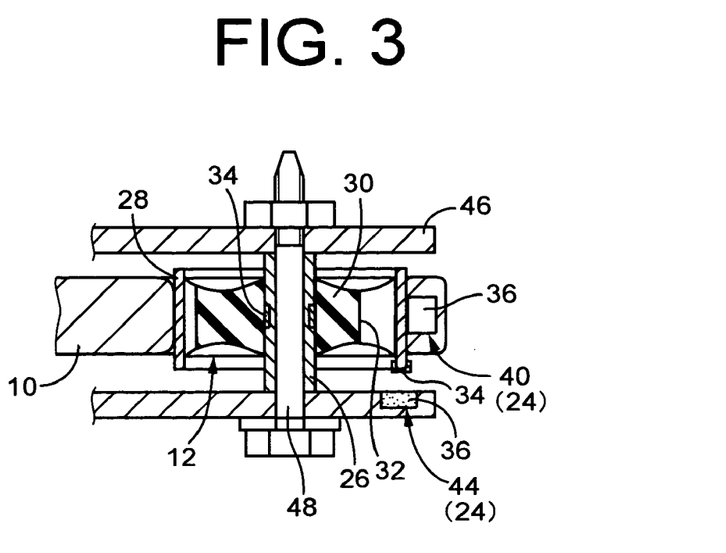
FIG. 3 is an enlarged vertical cross sectional view of the suspension bushing mounted portion of the suspension system of FIG. 1.

Specifically, as shown in FIGS. 2–3, the suspension bushing 12 is composed of an inner tubular fixture 26 as a first mounting member, and an outer tubular fixture 28 as a second mounting member, these being elastically connected by a rubber elastic body 30. The inner tubular fixture 26 has a small-diameter cylindrical shape, whereas the outer tubular fixture 28 has a large-diameter cylindrical shape, and is arranged generally coaxially with respect to the inner tubular fixture 26, with the outer tubular fixture 28 arranged spaced apart from the inner tubular fixture 26, to the outside thereof in the diametrical direction. Between the diametrically opposed faces of the inner tubular fixture 26 and the outer tubular fixture 28 is disposed a rubber elastic body 30 of thick-walled, generally cylindrical shape overall. The inner tubular fixture 26 and the outer tubular fixture 28 are bonded by a vulcanization molding to the inner and outer circumferential surfaces of this rubber elastic body 30 to produce an integral vulcanization molded component which constitutes the suspension bushing 12 of this embodiment.

Additionally, in the suspension bushing 12 of this embodiment, there are formed in the rubber elastic body 30 a pair of slits 32, 32 situated at mutually opposite locations to either side of the inner tubular fixture 26 in one diametric direction. Each of the slits 32, 32 extends through the rubber elastic body 30 in the axial direction, whereby an axis-perpendicular spring ratio, i.e., a ratio of spring constant as measured in a first diametric direction in which the slits 32, 32 are opposed to each other to a spring constant as measured in a second diametric direction perpendicular to the first diametric direction, is made large. With this arrangement, suspension characteristics of the suspension bushing are suitably tuned.

The distance sensor 24 for sensing a relative distance between the inner and outer tubular fixtures 26, 28 is incorporated between the inner tubular fixture 26 and the outer tubular fixture 28.

Figure 4:
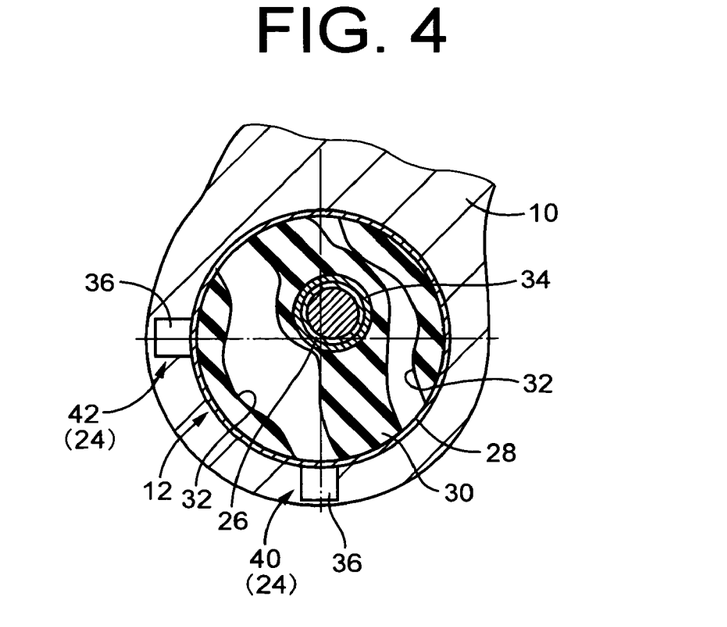
FIG. 4 is a view suitable for explaining a load input state of the suspension bushing of FIG. 2.

As shown in FIGS. 2–3, the distance sensor 24 may be composed of a target 34 and a sensor body 36 respectively installed at fixed locations at the outer circumferential surface of the inner tubular fixture 26 and the inner circumferential surface of the outer tubular fixture 28, so that the target 34 and the sensor body 36 are opposed to each other in a diametric direction. As shown in FIG. 4, when an external force is exerted on the L-arm 10 from the wheel, elastic deformation of the rubber elastic body 30 of the suspension bushing 12 is induced. An electrical signal of magnitude depending on the distance from the opposed face of the target 34 is output by the sensor body 36. A sensor of a kind known in the art is suitably employed as such a distance sensor. Preferably, a static change capacity type displacement gauge, an eddy current sensor, or the like could be appropriately employed.

In this embodiment, the amount of relative displacement of the inner tubular fixture 26 and the outer tubular fixture 28 is sensed in a total of three directions, i.e., the vehicle lengthwise, lateral, and vertical directions. Appropriately, sensing of displacement in these mutually orthogonal directions is achieved advantageously by means of a total of three sensors, namely, a lengthwise direction sensor 40 composed of a target 34 and a sensor body 36 positioned in opposition in the lengthwise direction, a lateral direction sensor 42 composed of a target 34 and a sensor body 36 positioned in opposition in the lateral direction, and a vertical direction sensor 44 composed of a target 34 and a sensor body 36 positioned in opposition in the vertical direction, so that the amount of relative displacement of inner tubular fixture 26 and outer tubular fixture 28 in each direction may be sensed independently.

In FIG. 3, which depicts the suspension bushing 12 installed in the vehicle, 46 denotes a bracket fastened to the body of the vehicle. The inner tubular fixture 26 is fastened to the bracket 46 by passing through the inner tubular fixture 26 an axis rod 48 composed of a bolt fixed to this bracket 46. The vertical direction sensor 44, which senses relative displacement on the inner tubular fixture 26 and the outer tubular fixture 28 of the suspension bushing 12 in the vehicle vertical direction, is installed, for example, at the vertically opposed faces of the outer tubular fixture 28 and the bracket 46 to which the inner tubular fixture 26 is fastened.

Figure 5:
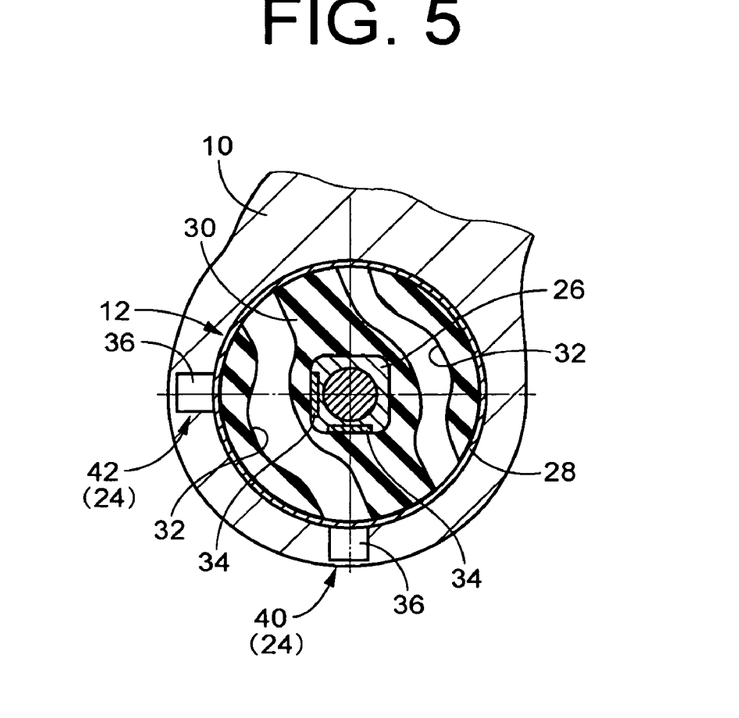
FIG. 5 is a cross sectional view corresponding to FIG. 2, and illustrates a suspension bushing constructed according to another preferred embodiment of the invention and usable in the suspension system of FIG. 1.

The basic type, structure, and placement structure of the sensor 24 for sensing relative displacement of the inner tubular fixture 26 and outer tubular fixture 28 of the suspension bushing 12 is not particularly limited. For example, as shown in FIG. 5, the inner tubular fixture 26 may have a squared-off outside wall configuration so that the installation surface for the target 34 of sensor 24 is a flat surface, thereby facilitating placement of the sensor 24. This arrangement makes the distance between the opposed faces of the inner tubular fixture 26 and outer tubular fixture 28 coincident with the direction substantially perpendicular to the surface of the inner tubular fixture 26, so that improved measuring accuracy may be achieved.

Figure 6:
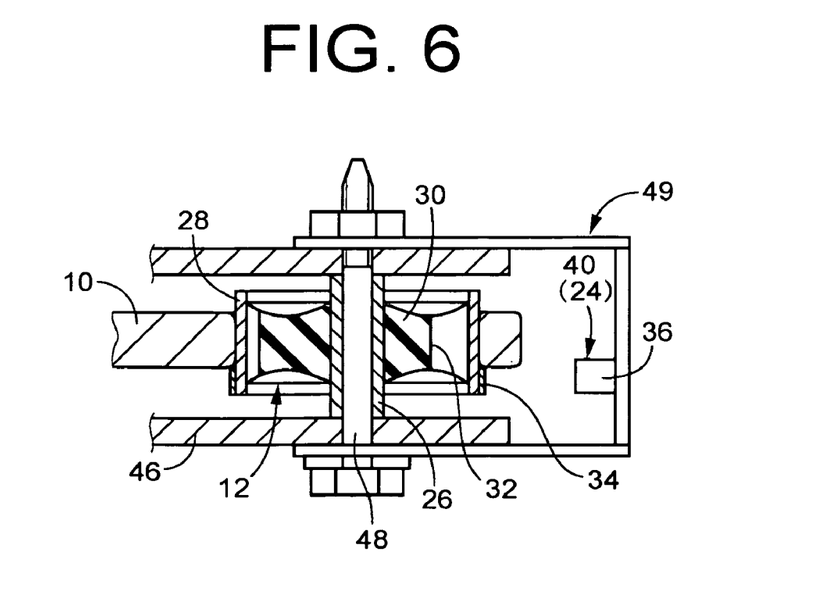
FIG. 6 is a cross sectional view corresponding to FIG. 3, and illustrates a suspension bushing constructed according to yet another preferred embodiment of the invention and usable in the suspension system of FIG. 1.

A variety of sensors may be acceptable for the sensor 24 provided a sensor is able to sense amount of relative displacement of inner tubular fixture 26 and outer tubular fixture 28 in three directions. For instance, a preferable sensor mounting structure arrangement as depicted in FIG. 6 may be employable in consideration of allowable placement space position of the sensor, etc. Described in detail, a sensor mounting fixture 49 of arched configuration projecting outwardly towards the bushing exterior from the body-mounted bracket 46 fastened to the inner tubular fixture 26 may be installed, so that the distance sensor 24 can be installed positioned some distance radially outward from the outer tubular fixture 28, in a gap between the opposed faces of the outer tubular fixture 28 and the sensor mounting fixture 49. Particularly where such a sensor mounting structure is employed, the target 34 and the sensor body 36 of the distance sensor 24 can be positioned directly opposed to one another with a gap therebetween. As a result, it is possible to improve measurement accuracy, as well as to enable adoption of, for example, a photoelectric element type distance sensor which utilizes light, so that it is possible to achieved improved measurement accuracy, as compared to the case where a foreign object, such as the rubber elastic body 30, is present between the target 34 and the sensor body 36.

Figure 7:
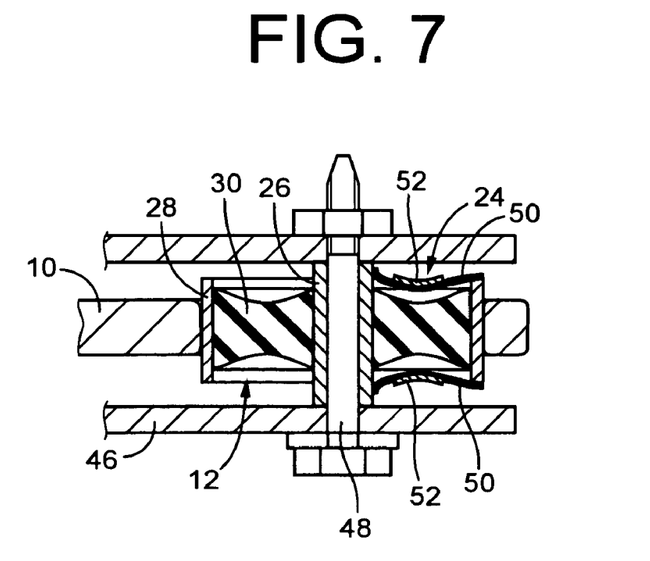
FIG. 7 is a cross sectional view corresponding to FIG. 3, and illustrates a suspension bushing constructed according to still another preferred embodiment of the invention and usable in the suspension system of FIG. 1.

Alternatively, instead of a distance sensor, a strain sensor, stress sensor, or pressure sensor could be utilized to sense the distance separating the inner tubular fixture 26 and outer tubular fixture 28. FIG. 7 shows an example of a strain sensor mounting structure, in which a deforming plate 50 may be installed straddling the gap between the inner tubular fixture 26 and the outer tubular fixture 28 which undergo relative displacement, and a strain sensor 52 attached to this deforming plate 50. With this arrangement, when the inner tubular fixture 26 and the outer tubular fixture 28 undergo relative displacement, the extent of relative displacement of the inner tubular fixture 26 and outer tubular fixture 28 can be determined from the output of the strain sensor 52, which senses depending on the extent of deformation of the deforming plate 50.

That is, the sensor 24 for installation on the suspension bushing 12 may consist of a sensor able to sense the magnitude of force exerted across the L-arm 10 and the body-mounted bracket 46 which are connected by the suspension bushing 12, either directly, or indirectly as a value corresponding to the amount of elastic deformation of the rubber elastic body 30, in the lengthwise, lateral, and vertical directions of the vehicle.

Sensor values sensed by the sensor 24 in this way may be subjected as-received, or amplified by means of a suitable amp, to electrical processes equivalent to mathematical operations performed at a processing unit (not shown), and then utilized as control signals in an antilock braking system or during traction control, vehicle stability control, or the like, for example.

As regards the overall design of an antilock braking system or other vehicle control system, since it is possible to employ any of various designs known in the art, rather than some design characteristic of the present invention, such design will not be described in detail herein. The following is a description of an example of a method for use when an external force value (load) exerted in the vehicle lengthwise, lateral, or vertical direction from the road surface onto the wheel 20 is required as a control signal for such a vehicle control system, wherein the external force value is derived by means of mathematical operations from sensor values of relative displacement of the inner tubular fixture 26 and the outer tubular fixture 28, provided by the sensor 24 of the suspension bushing 12.

The suspension bushing 12 of this embodiment is furnished with the following elements.

(1) Means for measuring amount of relative displacement of the inner tubular fixture 26 and the outer tubular fixture 28 of the suspension bushing 12 connected to the L-arm and mounted on automobile: In this embodiment in particular, the sensor 24 is furnished for sensing an amount of relative displacement in the vehicle lengthwise direction (x direction), vehicle lateral direction (y direction), and vehicle vertical direction (z direction).

(2) Starting point memory means for sensing relative displacement of the inner tubular fixture 26 and the outer tubular fixture 28 under conditions in which the wheels of the automobile are not subjected to driving outside force (load), and placing this sensor output in memory as sensed starting point.
(3) Bushing conversion data memory means for storing displacement amount/load conversion data: This displacement amount/load conversion data has been pre-calculated for the purpose of converting amount of relative displacement, measured by the sensor 24, in each of the vehicle lengthwise direction (x direction), vehicle lateral direction (y direction), and vehicle vertical direction (z direction) into magnitude of a load acting on the suspension bushing 12 in each of the vehicle lengthwise direction (x direction), vehicle lateral direction (y direction), and vehicle vertical direction (z direction).
(4) Bushing load computing means for deriving load exerted on the suspension bushing 12 in the x, y and z directions, from sensor values for displacement in the x, y and z directions sensed by the aforementioned sensor (1), using stored data from the bushing conversion data memory means (3).
(5) Tire conversion data memory means that stores data for converting load acting on the suspension bushing 12 to external force on the tire, using pre-calculated relationships of magnitude of force exerted on the wheel 20 in each of the vehicle lengthwise direction (x direction), vehicle lateral direction (y direction), and vehicle vertical direction (z direction) to magnitude of load exerted thereby on the suspension bushing 12 in each of the vehicle lengthwise direction (x direction), vehicle lateral direction (y direction), and vehicle vertical direction (z direction).
(6) Tire external force computing means for deriving external force exerted on the wheel 20 in the x, y and z directions from bushing load in the x, y and z directions calculated by (4), using stored data from the tire conversion data memory means (5).

The aforementioned starting point memory means (2) will be required during correction or other operations. However, by means of a suitable setting process for the computing process method of bushing load computing means (4), the starting point memory means (2) may not necessarily be required.

When deriving a control signal for an antilock braking system or other vehicle control system using the arrangements described in (1)–(6) hereinabove, processing may be carried out according to the following steps (i)–(iii), for example.
(i) During driving of the vehicle, an amount of relative displacement in each of the vehicle lengthwise direction (x direction), vehicle lateral direction (y direction), and vehicle vertical direction (z direction) is sensed by the sensor 24 of the suspension bushing 12.
(ii) Using stored data from the bushing conversion data memory means, the bushing load computing means calculates, from the relative displacement sensed in (i), the load FBx, FBy, FBz exerted on the suspension bushing 12 each direction x, y, z.
(iii) Using stored data from the tire conversion data memory means, the tire external force computing means calculates, from the load FBx, FBy, FBz bearing on suspension bushing 12 derived in (ii), external force FTx, FTy, FTz exerted on the wheel 20 in each direction x, y, z.

Figure 8:
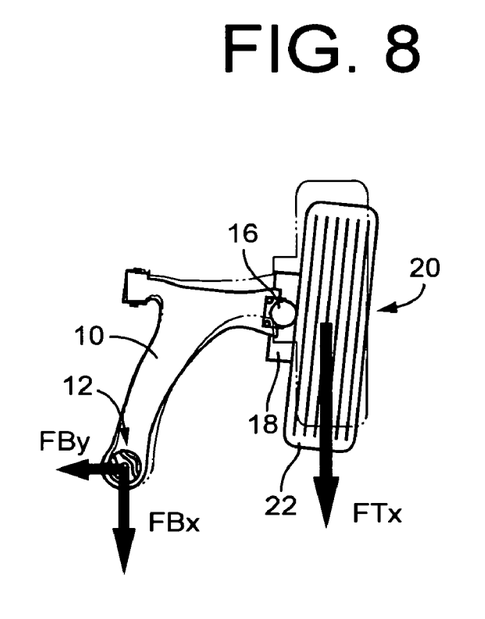
FIG. 8 is a view suitable for explaining a state of load acting on the suspension bushing when a wheel of the suspension system is subjected to an external force in a vehicle driving direction.
Figure 9:
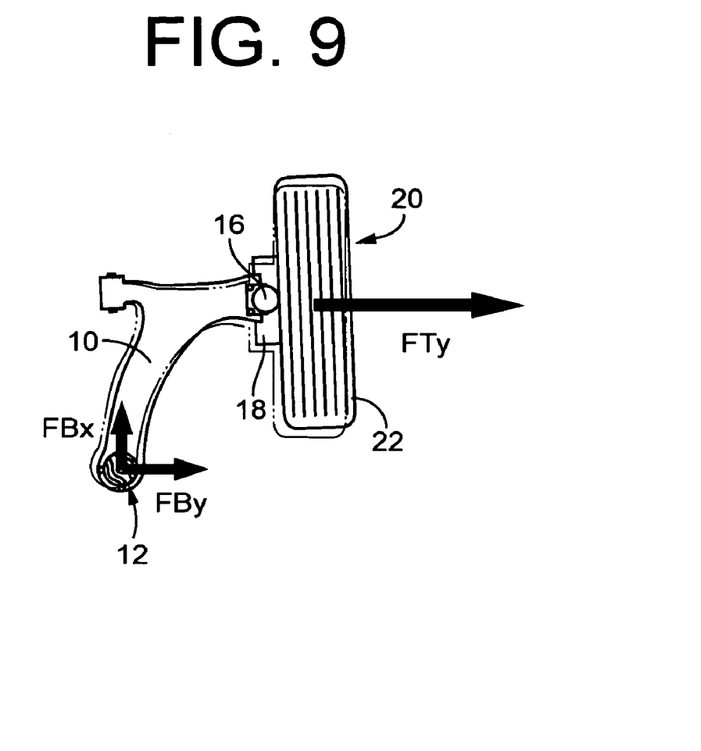
FIG. 9 is a view suitable for explaining a state of load acting on the suspension bushing when a wheel of the suspension system is subjected to an external force in a vehicle lateral direction.
Figure 10:
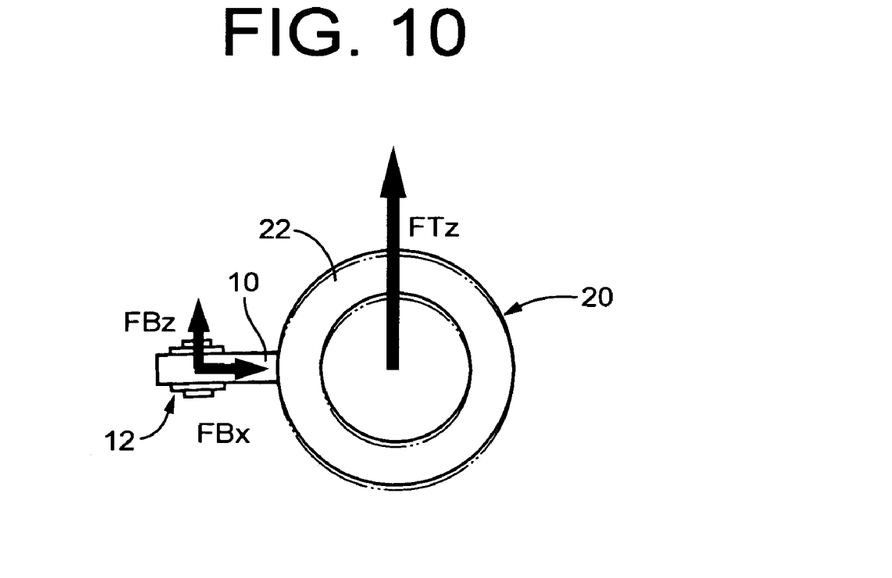
FIG. 10 is a view suitable for explaining a state of load acting on the suspension bushing when a wheel of the suspension system is subjected to an external force in a vehicle vertical direction.

As illustrated in FIGS. 8, 9 and 10, the process of (iii) can be computed according to the following equation (1), on the basis of a relational equation between external force acting on the wheel 20 in the vehicle lengthwise, lateral, and vertical directions, and load acting on the suspension bushing 12 in the vehicle lengthwise, lateral, and vertical directions.

$$[FB]=[H][FT]$$

$$\begin{Bmatrix} FBx \\ FBy \\ FBz \end{Bmatrix} = \begin{Bmatrix} Hxx & Hxy & Hxz \\ Hyx & Hyy & Hyz \\ Hzx & Hzy & Hzz \end{Bmatrix} \begin{Bmatrix} FTx \\ FTy \\ FTz \end{Bmatrix} \quad (1)$$

$$[FT]=[H]^{-1}[FB]$$

Values for external force exerted on the wheels (estimated tire external force) FTx, FTy, FTz derived in this manner can be used as control signals for an antilock braking system or other vehicle control system. Generally, such a vehicle control system may be employed in an automotive vehicles having a suspension system of four wheel independent suspension type. In this case, signals similar sensed at the vehicle body mounting locations of the suspension arms would be input to a vehicle control system, and the overall driving condition of the vehicle may be determined by taking into consideration sensor values for engine rpms, wheel rotation speed and the like together with estimated external force for the four wheels.

Since external force exerted on the wheel 20 corresponds to the amount of relative displacement of the inner tubular fixture 26 and the outer tubular fixture 28 sensed in the suspension bushing 12, depending on the particular vehicle control system, it may be possible to employ as the control signal therefor the unmodified sensor signal from the sensor 24 indicating relative displacement of inner tubular fixture 26 and outer tubular fixture 28, without the need to calculate external force on the wheel 20 as described hereinabove, and amplifying the signal by means of an amp where necessary.

Where the suspension system like that described hereinabove is employed, external force acting on the wheel 20 can be sensed with substantially no lag time and with a high degree of accuracy. In particular, since an estimate of external force on the wheel 20 can be arrived at in the suspension bushing 12, which does not normally undergo relative displacement or rotation relative to the body as does the wheel 20, and which is sufficiently spaced away from the wheel 20 by means of the suspension member, the sensing structure can be made simpler, and with excellent robustness and durability.

While the invention has been shown and described in detail hereinabove with reference to certain preferred embodiments, for illustrative purpose only, it is to be understood that the invention is not limited to the details of the illustrated embodiments, but may be otherwise embodied with various other changes, modifications and improvements, which may occur to those skilled in the art, without departing from the spirit and scope of the invention defined in the following claims.

For example, while there has-been shown hereinabove an example implementing a vibration damping device wherein one of the two suspension bushings 12, 14 connecting the L-arm 10 to the body is of construction according to the invention, it would be possible to implement a vibration damping device wherein both of the suspension bushings 12, 14 are of construction according to the invention, with a load exerted on the body from the L-arm 10 sensed at portions of both. With such an arrangement, signals sensed by the two suspension bushings 12, 14 can be solved by simultaneous equations, making it possible to arrive a load exerted on the body from the L-arm 10 and hence external force exerted on the wheel 20, with an even higher degree of accuracy.

In the embodiment hereinabove, sensing of the amount of relative displacement between the inner tubular fixture 26 and outer tubular fixture 28 was described as the load sensing means for sensing a signal corresponding to a load exerted across the body and the wheel via the suspension member. However, it would also be possible to sense the load bearing on the inner tubular fixture 26. Specifically, for example, it would be possible to install a strain sensor on the inner tubular fixture 26 or mounting portion of the axis rod 48 thereof to the body-mounted bracket 46, and utilize the sensor value of a load exerted on the inner tubular fixture 26.

Figure 11:
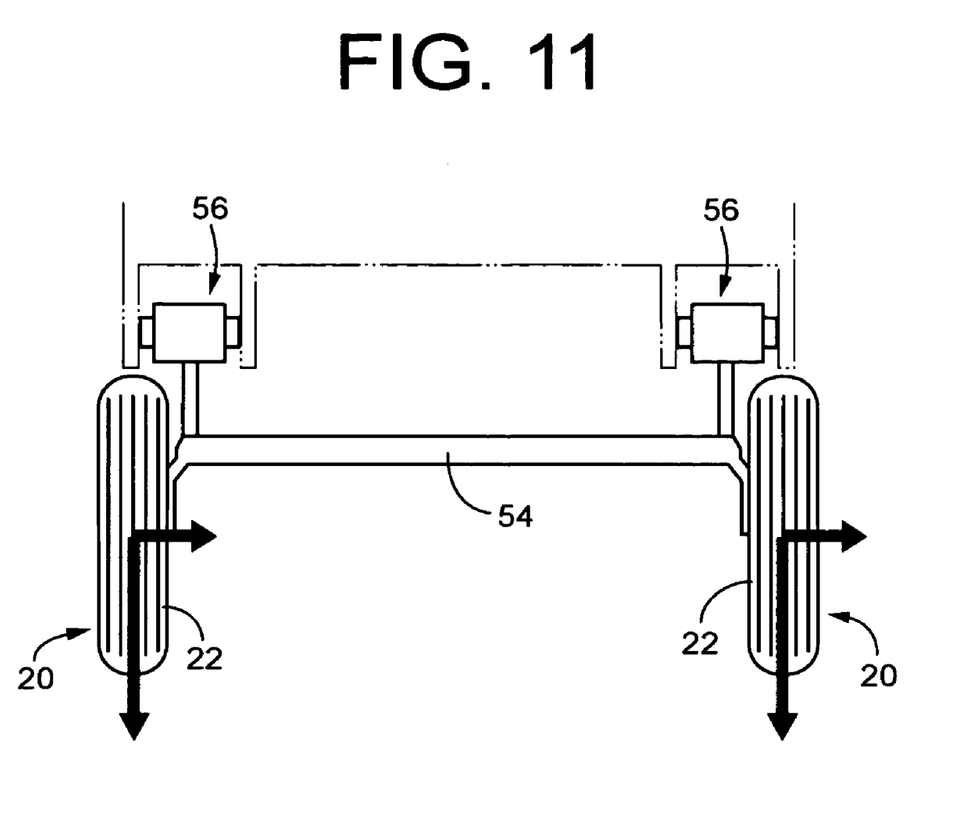
FIG. 11 is a schematic plane view of a suspension system constructed according to one preferred embodiment of the invention.

The suspension configuration in which the invention is implemented is not limited to an L-arm as described hereinabove. The invention is practicable using various other kinds of suspension arm, such as an A-arm, trailing arm, lower arm, upper arm, or the like. Even in a multi-link suspension for connecting the knuckle to the body by a plurality of links, the present invention may be realized by means of selecting an appropriate suspension bushing, or selecting a suspension bushing attached to a plurality of links, and implementing a vibration damping device according to the invention. Additionally, apart from the independent suspension type suspension member exemplified hereinabove, it is possible to realize a suspension system according to the invention similar to that in the embodiment hereinabove in a torsion beam type suspension member 54 like that depicted in FIG. 11, where the left and right wheels 20, 20 are connected in the lateral vehicle axial direction, by implementing a vibration damping device according to the invention in the suspension bushings 56, 56 installed on the swinging connection portions to the body.

What is claimed is:

1. A vibration damping device for use in a suspension system of an automotive vehicle, adapted to be disposed at a linking portion between a body of the vehicle and a suspension member that connects and supports a wheel on the body, the vibration damping device comprising a load sensing unit adapted to sense a signal corresponding to a load exerted between the body and the suspension member, wherein the load sensing unit is capable of sensing external force exerted on the wheel in each of three directions, a lengthwise direction, a lateral direction, and a vertical direction of the vehicle, on a basis of a signal corresponding to a load exerted across the body and the wheel.

2. A vibration damping device according to claim 1, further comprising a processing unit for deriving external force exerted on the wheel in three directions, the lengthwise direction, lateral direction, and vertical direction of the vehicle, by processing the signal obtained by means of the load sensing unit in mathematical operations on the basis of output characteristics of the load sensing unit obtained in advance.

3. A vibration damping device for use in a suspension system of an automotive vehicle, adapted to be disposed at a linking portion between a body of the vehicle and a suspension member that connects and supports a wheel on the body, the vibration damping device comprising a load sensing unit adapted to sense a signal corresponding to a load exerted between the body and the suspension member, wherein the vibration damping device comprises a rubber busing including a first mounting member fixable to the body of the vehicle, a second mounting member fixable to the suspension member, and an rubber elastic body elastically connecting the first and second mounting members, and wherein the load sensing unit comprises a distance sensor adapted to sense an amount of relative displacement between the first mounting member and the second mounting member.

4. A vibration damping device according to claim 3, wherein the distance sensor is capable of sensing the amount of relative displacement of the first mounting member and the second mounting member in a lengthwise direction, lateral direction and vertical direction of the vehicle.

5. A vibration damping device according to claim 3, wherein the distance sensor includes a target installed at a fixed location at one of the first and second mounting members, and a sensor body installed at a fixed location at an other one of the first and second mounting members so as to be opposed to the target in a direction in which the first and second mounting members undergo relative displacement.

6. A suspension system for an automotive vehicle comprising: a suspension member for connecting and supporting a wheel on a body of the vehicle; and a vibration damping device adapted to be disposed at a linking portion between the body and the suspension member, wherein the vibration damping device comprises a load sensing unit adapted to sense a signal corresponding to a load exerted between the body and the suspension member, wherein the load sensing unit is capable of sensing external force exerted on the wheel in each of three directions, a lengthwise direction, a lateral direction, and a vertical direction of the vehicle, on a basis of a signal corresponding to a load exerted across the body and the wheel.

7. A suspension system according to claim 6, further comprising another vibration damping device adapted to be disposed at another linking portion between the body of the vehicle and the suspension member.

8. A suspension system according to claim 6, wherein the suspension member comprises an independent suspension type suspension arm.

* * * * *